(12) United States Patent
Salin et al.

(10) Patent No.: US 10,981,754 B2
(45) Date of Patent: Apr. 20, 2021

(54) ELEVATOR CAR WALL

(71) Applicant: KONE Corporation, Helsinki (FI)

(72) Inventors: Tero Salin, Helsinki (FI); Mika Hautamäki, Helsinki (FI)

(73) Assignee: KONE CORPORATION, Helsinki (FI)

( * ) Notice: Subject to any disclaimer, the term of this patent is extended or adjusted under 35 U.S.C. 154(b) by 450 days.

(21) Appl. No.: 15/997,295

(22) Filed: Jun. 4, 2018

(65) Prior Publication Data

US 2018/0370768 A1    Dec. 27, 2018

(30) Foreign Application Priority Data

Jun. 21, 2017  (EP) .................................... 17177137

(51) Int. Cl.
*B66B 11/02*    (2006.01)
*F16B 5/06*    (2006.01)

(52) U.S. Cl.
CPC ...... *B66B 11/0253* (2013.01); *B66B 11/0226* (2013.01); *F16B 5/0607* (2013.01)

(58) Field of Classification Search
CPC ............ B66B 11/0226; B66B 11/0253; F16B 5/0607; F16B 2005/0678
See application file for complete search history.

(56) References Cited

U.S. PATENT DOCUMENTS

| | | | | |
|---|---|---|---|---|
| 5,062,250 A * | 11/1991 | Buzzella | ................. | E04D 3/352 52/586.2 |
| 6,763,643 B1 * | 7/2004 | Martensson | .......... | E04F 15/102 52/586.1 |
| 7,665,264 B1 * | 2/2010 | Wolfe | ........................ | E04B 1/14 52/586.2 |
| 8,266,863 B2 * | 9/2012 | Knauseder | .............. | E04F 15/02 52/586.2 |
| 8,978,333 B2 * | 3/2015 | Potter | ..................... | E04C 2/049 52/582.1 |
| 9,611,640 B2 * | 4/2017 | Mayer | ........................ | E04B 2/72 |
| 9,890,543 B2 * | 2/2018 | Aquilani | ................. | E04F 13/10 |

(Continued)

FOREIGN PATENT DOCUMENTS

| CN | 205653001 U | 10/2016 |
|---|---|---|
| WO | WO 2012/071676 A1 | 6/2012 |
| WO | WO 2013/098474 A1 | 7/2013 |

OTHER PUBLICATIONS

European Search Report issued in Application No. EP 17 17 7137, dated Dec. 1, 2017.

*Primary Examiner* — Minh Truong
(74) *Attorney, Agent, or Firm* — Birch, Stewart, Kolasch & Birch, LLP

(57) ABSTRACT

An elevator car wall includes a support construction formed of a grid structure with vertical and horizontal support rods and a surface construction formed of panels attached with panel fastening elements to the grid structure. A vertical seam profile with a U-shaped bottom portion and an I-shaped middle portion is positioned between panel rows and attached with seam profile fastening elements to the grid structure. The middle portion extends between the vertical edges of the panel rows. A portion of the panel fastening element extends into contact with an inside surface of a respective branch of the U-shaped bottom portion in order to secure the vertical side edge of the panel against the middle portion.

19 Claims, 11 Drawing Sheets

(56) References Cited

U.S. PATENT DOCUMENTS

2004/0083675 A1* 5/2004 Grimes ............... B66B 11/0253
  52/586.2
2015/0040508 A1* 2/2015 Zhang ............... E04F 15/02044
  52/582.1

* cited by examiner

ELEVATOR CAR WALL

FIELD

The invention relates to an elevator car wall.

BACKGROUND

An elevator comprises typically a car, an elevator shaft, a machine room, lifting machinery, ropes, and a counter weight. The elevator car is positioned within a car frame that supports the car. The lifting machinery may comprise a sheave, a machinery brake, an electric motor, and a drive for the electric motor. The lifting machinery may move the car in a vertical direction upwards and downwards in the vertically extending shaft. The ropes may connect the car frame and thereby also the car via the sheave to the counter weight. The car frame may further be supported with gliding means on guide rails extending in the vertical direction in the shaft. The gliding means may comprise rolls rolling on the guide rails or gliding shoes gliding on the guide rails when the elevator car is mowing upwards and downwards in the shaft. The guide rails may be supported with fastening brackets on the side wall structures of the shaft. The gliding means engaging with the guide rails keep the car in position in the horizontal plane when the car moves upwards and downwards in the shaft. The counter weight may be supported in a corresponding way on guide rails supported on the wall structure of the shaft. The elevator car may transport people and/or goods between the landings in the building. The shaft may be formed of solid walls and/or of open steel structures.

WO publication 2013/098474 discloses an elevator car and an elevator. The elevator car comprises a frame structure being formed of a rectangular floor element, vertical support beams extending upwards from the corners of the floor element, and horizontal support beams extending between the upper ends of the vertical support beams. The elevator car comprises further a plurality of planar elements of rectangular shape fixed side-by-side on the inside of the frame structure forming a uniform wall surface and roof surface of the car. The plurality of planar elements comprises elements differing to each other in respect of the functionalities integrated into the planar elements.

SUMMARY

An object of the present invention is to present a novel elevator car wall.

The elevator car wall is defined in claim 1.

The elevator car wall comprises a support construction formed of a grid structure with vertical support rods and horizontal support rods and a surface construction formed of panels attached with panel fastening elements to the grid structure, adjacent vertical rows of panels being separated by a vertical seam profile that is attached with seam profile fastening elements to the grid structure, the seam profile comprising a bottom portion having a U-shaped horizontal cross section, a middle portion having an I-shaped horizontal cross section, the middle portion extending between the branches of the U in the bottom portion from a bottom of the U outwards beyond the outer ends of the branches of the U and further in between the vertical edges of the adjacent rows of panels, whereby a portion of the panel fastening element extends into contact with an inside surface of a respective branch of the U-shaped bottom portion of the seam profile in order to secure the vertical side edge of the panel to the middle portion of the seam profile.

The arrangement of using a vertical seam profile between the rows of panels in the car wall bundles the panels tightly together.

The arrangement contributes to prevent noise and dust from entering into the interior of the car from the exterior of the car.

The arrangement makes the panel seams fire proof. The seam profile may be made of metal, which is fire proof.

The arrangement makes the installation of the panels to the grid structure easy and fast.

The arrangement contributes to a visually attractive look of the car wall. A minimalistic and modern look of the car wall is achieved with the arrangement.

DRAWINGS

The invention will in the following be described in greater detail by means of preferred embodiments with reference to the attached drawings, in which.

Figure 10:
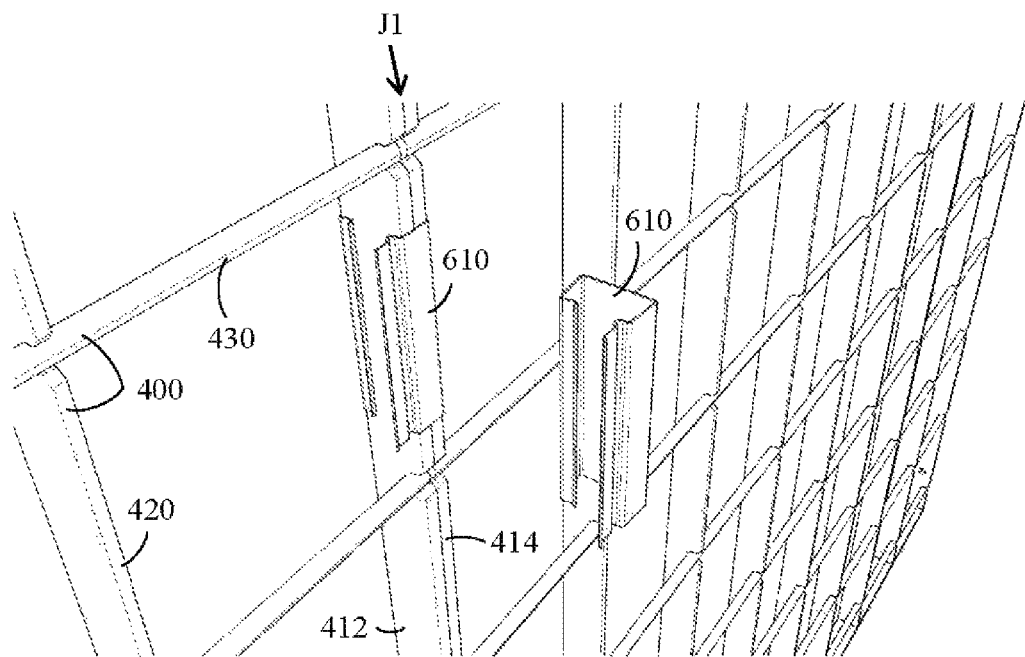
Figure 11:
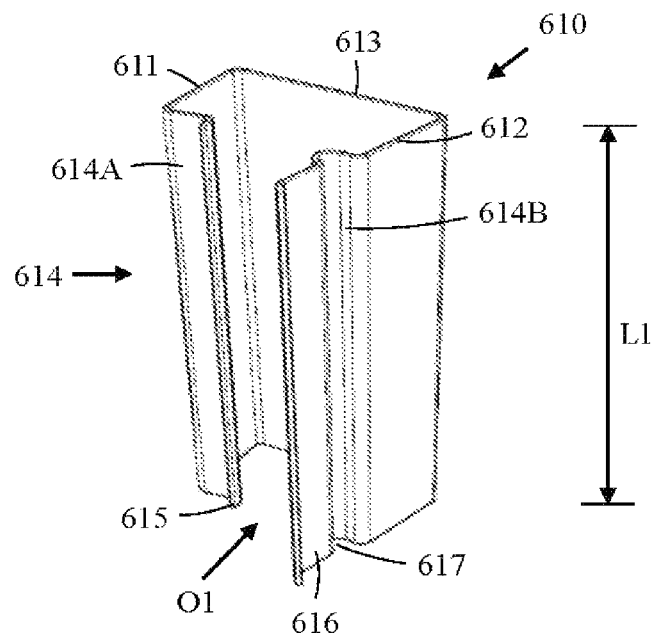
Figure 12:
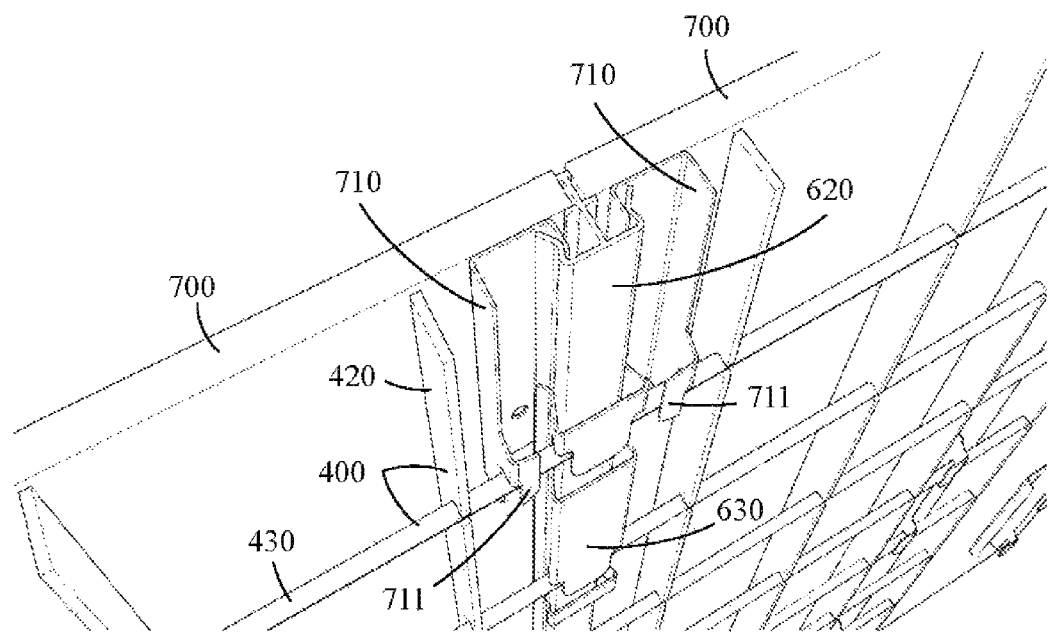
Figure 13:
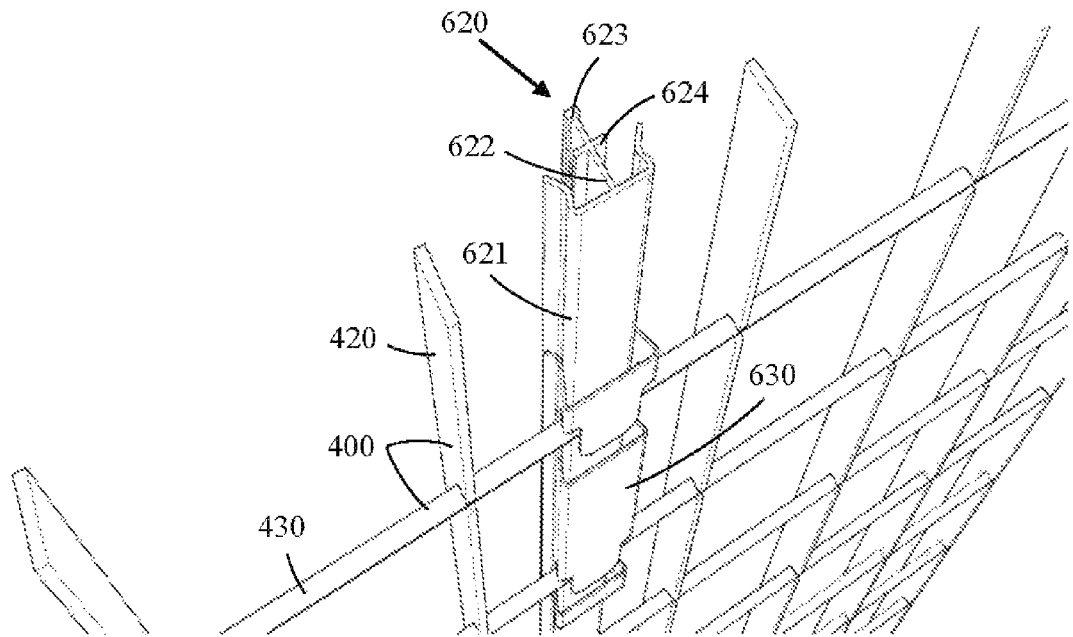
Figure 14:
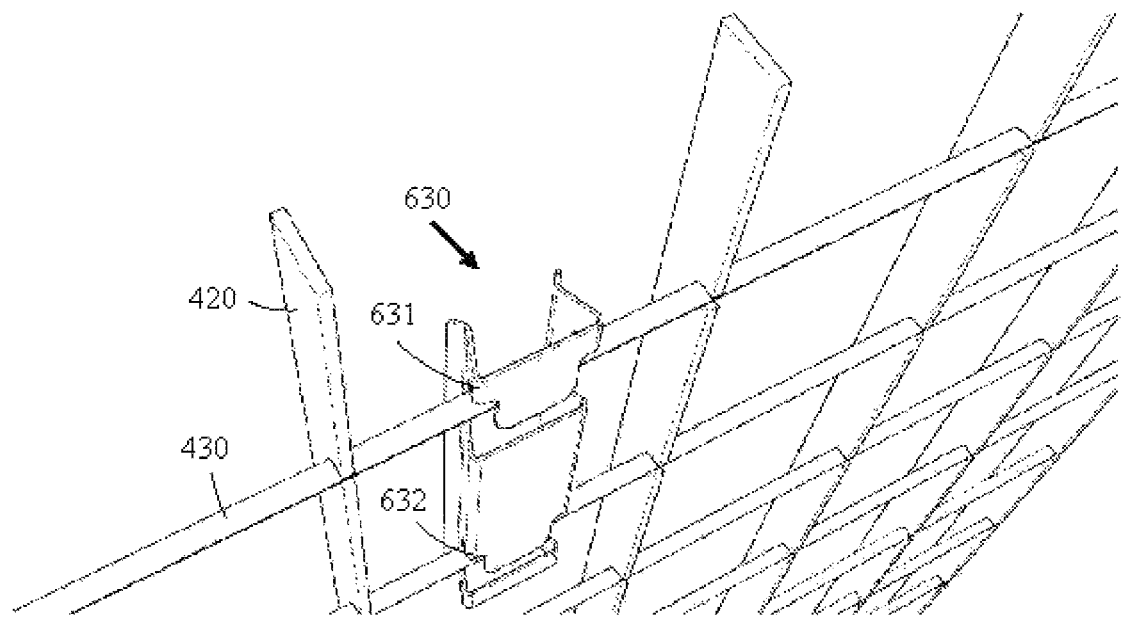
Figure 15:
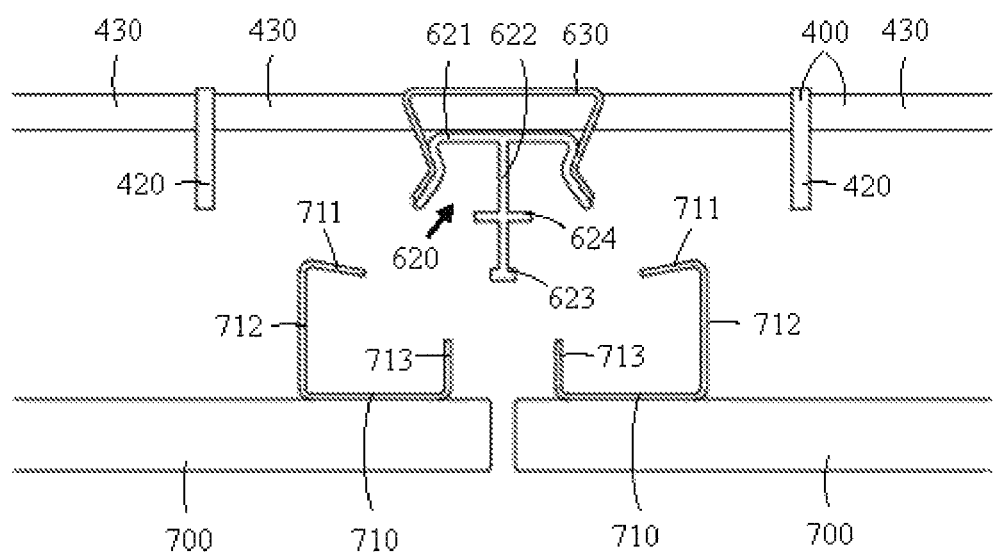
Figure 16:
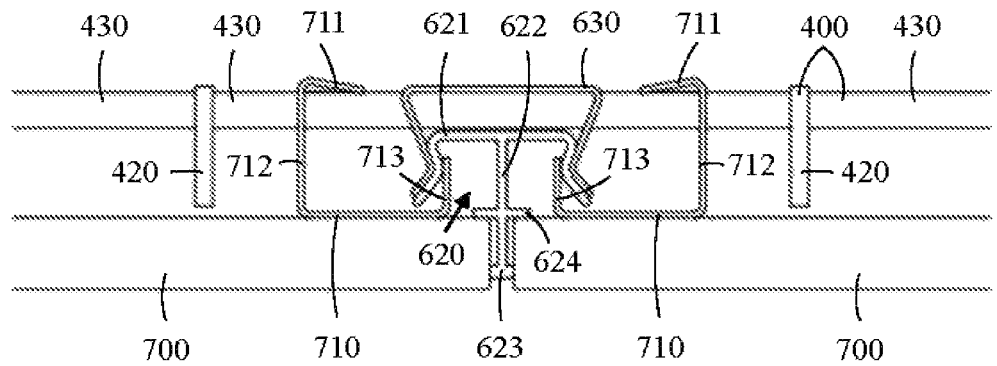
Figure 17:
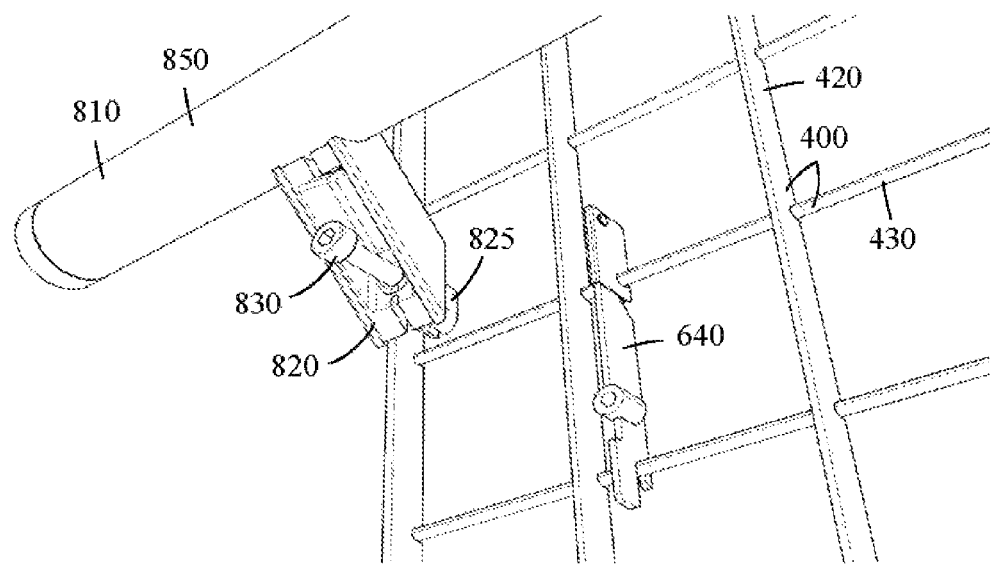
Figure 18:
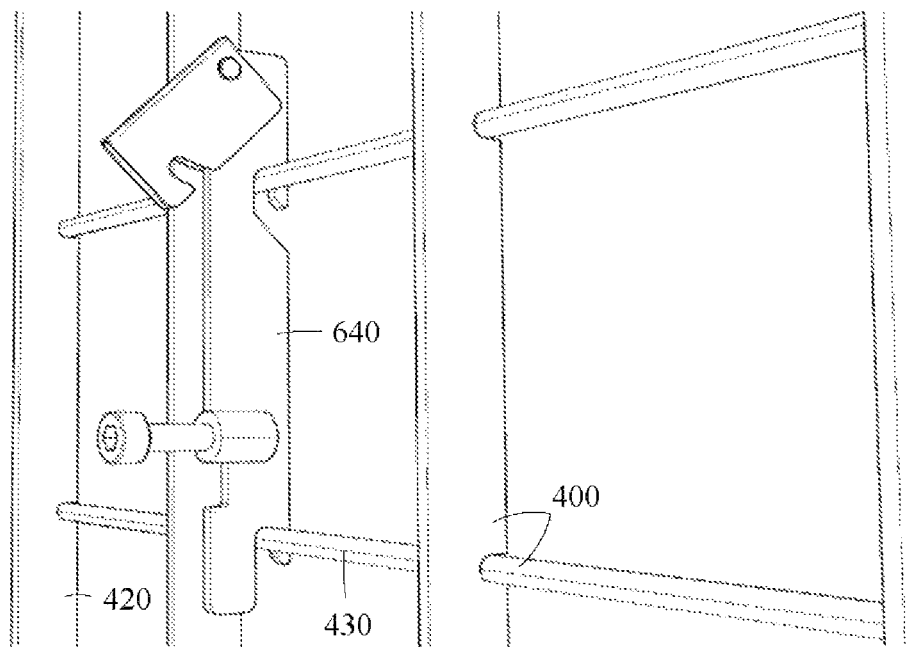
Figure 19:
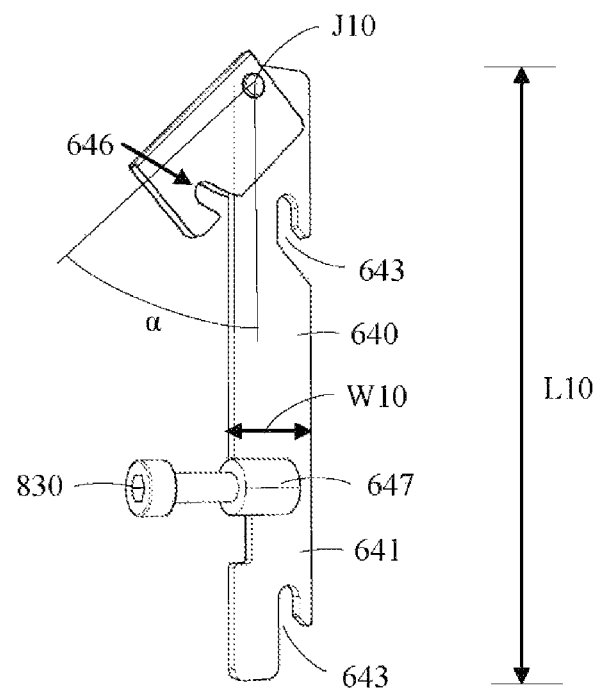
Figure 20:
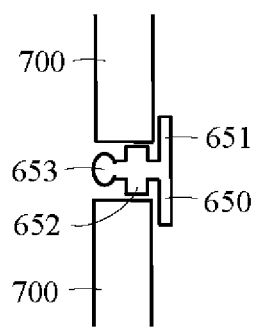
Figure 21:
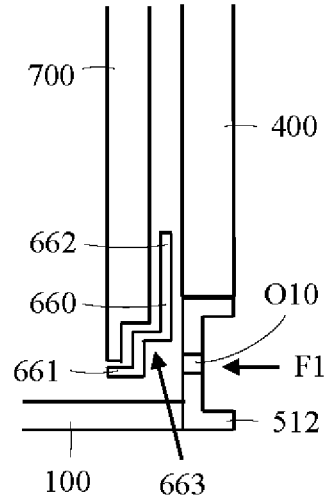
Figure 22:
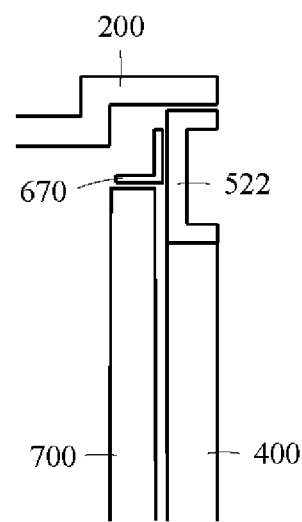

FIG. 10 shows an axonometric view of a fastening arrangement between two grid modules, FIG. 11 shows the grid fastening element used in FIG. 10, FIG. 12 shows an axonometric view of a fastening arrangement for panels to the grid structure, FIG. 13 shows a vertical seam profile used in FIG. 12, FIG. 14 shows the seam profile fastening element used in FIG. 13, FIG. 15 shows a cross section of the seam profile fastening element used in FIG. 13 when the panels are to be installed, FIG. 16 shows a cross section of the seam profile fastening element used in FIG. 13 when the panels have been installed, FIG. 17 shows an axonometric view of a fastening arrangement for a handrail or a pivoted seat in the elevator car, FIG. 18 shows the accessory fastening element of FIG. 15 on the grid structure, FIG. 19 shows the accessory fastening element of FIGS. 15 and 16, FIG. 20 shows a cross section of a horizontal seam profile, FIG. 21 shows a cross section of a bottom levelling arrangement, FIG. 22 shows a cross section of a locking arrangement of the panels.

DETAILED DESCRIPTION

Figure 1:
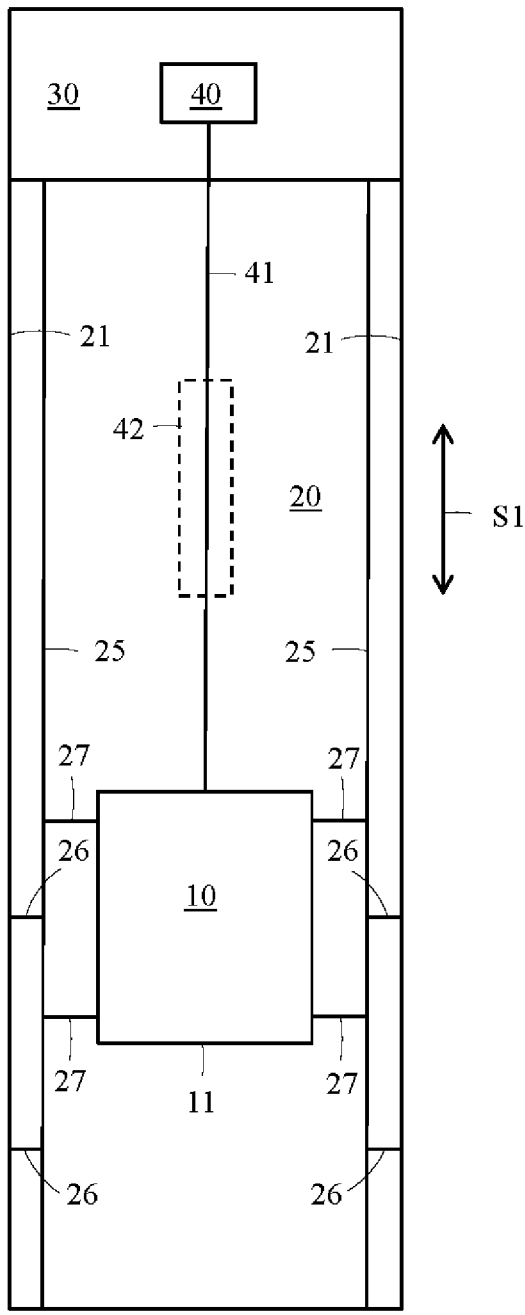
FIG. 1 shows a vertical cross section of an elevator.
Figure 2:
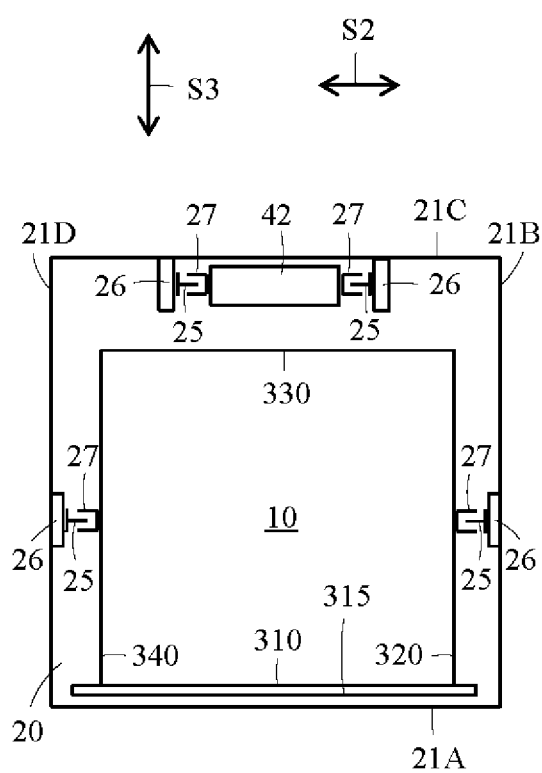
FIG. 2 shows a horizontal cross section of the elevator.

FIG. 1 shows a vertical cross section and FIG. 2 shows a horizontal cross section of an elevator.

The elevator may comprise a car 10, a shaft 20, a machine room 30, lifting machinery 40, ropes 41, and a counter weight 42.

The lifting machinery 40 moves the car 10 upwards and downwards in the vertically extending elevator shaft 20. The shaft 20 may be provided with a front wall 21A, an opposite back wall 21C, and two opposite side walls 21B, 21D. The front wall 21A may be provided with openings on the landings, whereby said openings are provided with landing doors. Each of the walls 21A, 21B, 21C, 21D in the shaft 20 may be formed as solid walls or as an open steel structure.

A car frame 11 may surround the car 10. The car frame 11 may be a separate frame or formed as an integral part of the car 10. The car frame 11 may be connected by the ropes 41 to the counter weight 42. The car 10 may be provided with a front wall 310, an opposite back wall 330, and two opposite side walls 320, 340. The front wall 310 may have an opening provided with a car door element 315. The car door element 315 may comprise centre-opening or side-opening door panels. The car door element 315 may comprise any number of door panels.

The car frame 11 may be supported with gliding means 27 at guide rails 25 extending in the vertical direction in the shaft 20. The figure shows two guide rails 25 at opposite sides of the car 10. The gliding means 27 may comprise rolls rolling on the guide rails 25 or gliding shoes gliding on the guide rails 25 when the car 10 is moving upwards and downwards in the shaft 20.

The counter weight 42 may be supported in a corresponding way on guide rails 25 that are attached to one or more walls of the shaft 20.

The guide rails 25 may be attached with fastening brackets 26 on the side walls of the shaft 20. The figure shows only two fastening brackets 26, but there are several fastening brackets 26 along the height of each guide rail 25. The cross section of the guide rails 25 may have the form of a letter T. The vertical branch of the guide rail element 25 may form three gliding surfaces for the gliding means 27 comprising rolls or gliding shoes. There may thus be two opposite side gliding surfaces and one front gliding surface in the guide rail 25. The cross-section of the gliding means 27 may have the form of a letter U so that the inner surface of the gliding means 27 sets against the three gliding surfaces of the guide rail 25. The gliding means 27 may be attached to the sling 11 and/or to the counter weight 42.

The gliding means 27 engage with the guide rails 25 and keep the elevator car 10 and/or the counter weight 42 in position in the horizontal plane when the car 10 and/or the counter weight 42 moves upwards and downwards in the shaft 20. The car 10 transports people and/or goods between the landings in the building.

FIGS. 1-2 show a first direction S1, which is a vertical direction in the elevator shaft 20, a second direction S2, which is the direction between the guide rails (DBG) and a third direction S3, which is the direction from the back wall 21C to the front wall 21A in the shaft 20 (BTF). The second direction S2 is perpendicular to the third direction S3.

The use of the invention is not limited to the type of elevator disclosed in FIGS. 1-2. The invention can be used in any type of elevator e.g. also in elevators lacking a machine room 30 and/or a counterweight 42. The counterweight 42 could, instead of being positioned on the back wall 21C, be positioned on either side wall 21B, 21D or on both side walls 21B, 21D of the elevator shaft 20. The lifting machinery 40 could, instead of being positioned in the machine room 30, be positioned anywhere within the shaft 20 i.e. at the top portion of the shaft 20, at the middle portion of the shaft 20 or at the bottom portion of the shaft 20. The car 10 could be provided with two or more car door elements 315. The car 10 could e.g. be a so called through type car 10 having a first car door element 315 in the front wall 310 and a second car door element 315 in the back wall 330. The car 10 may be provided with a car frame 11 i.e. a sling or the sling 11 may be integrated into the car 10. The sling 11 may be integrated into the car 10 so that the uprights passing vertically on both sides of the car 10 are left out.

Figure 3:
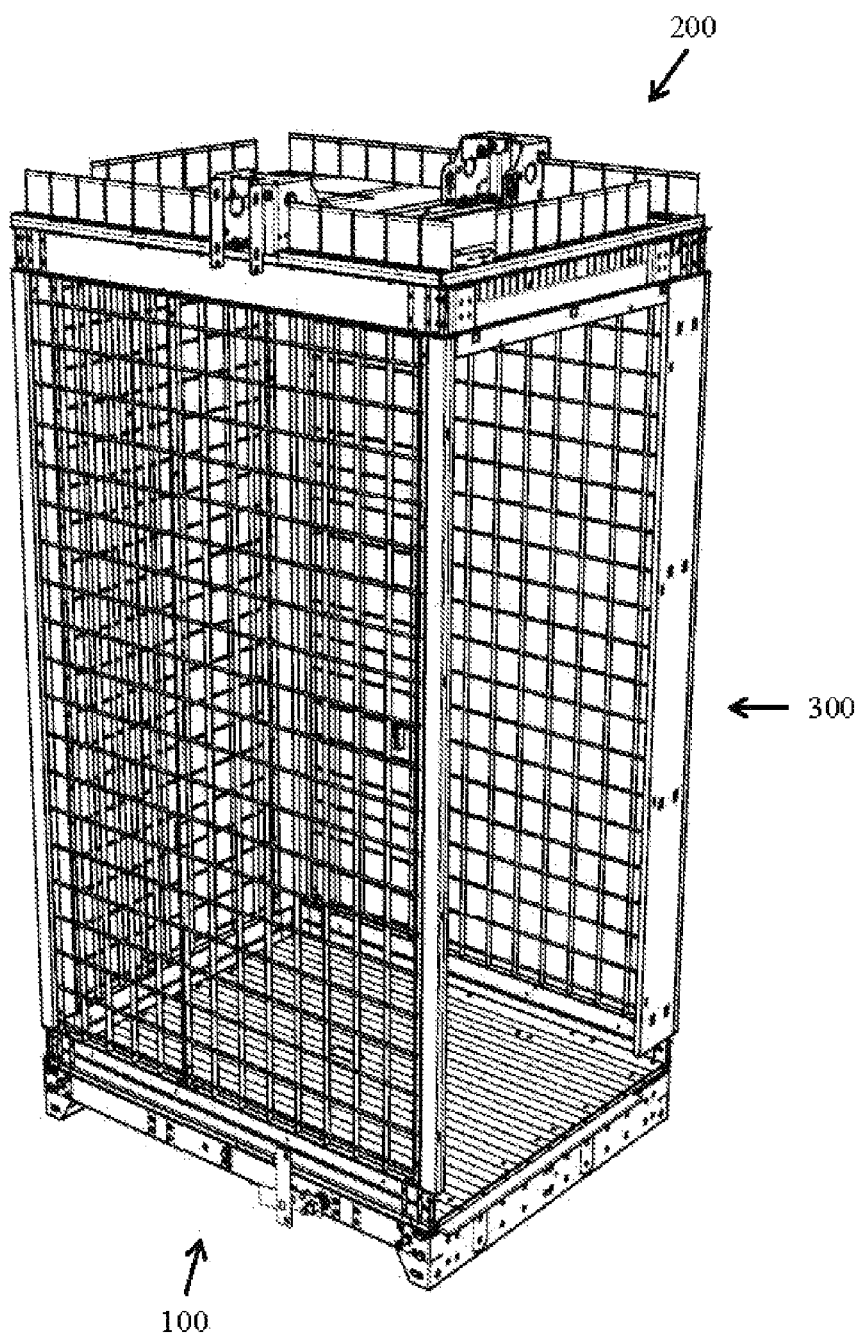
FIG. 3 shows an axonometric view of a car.
Figure 4:
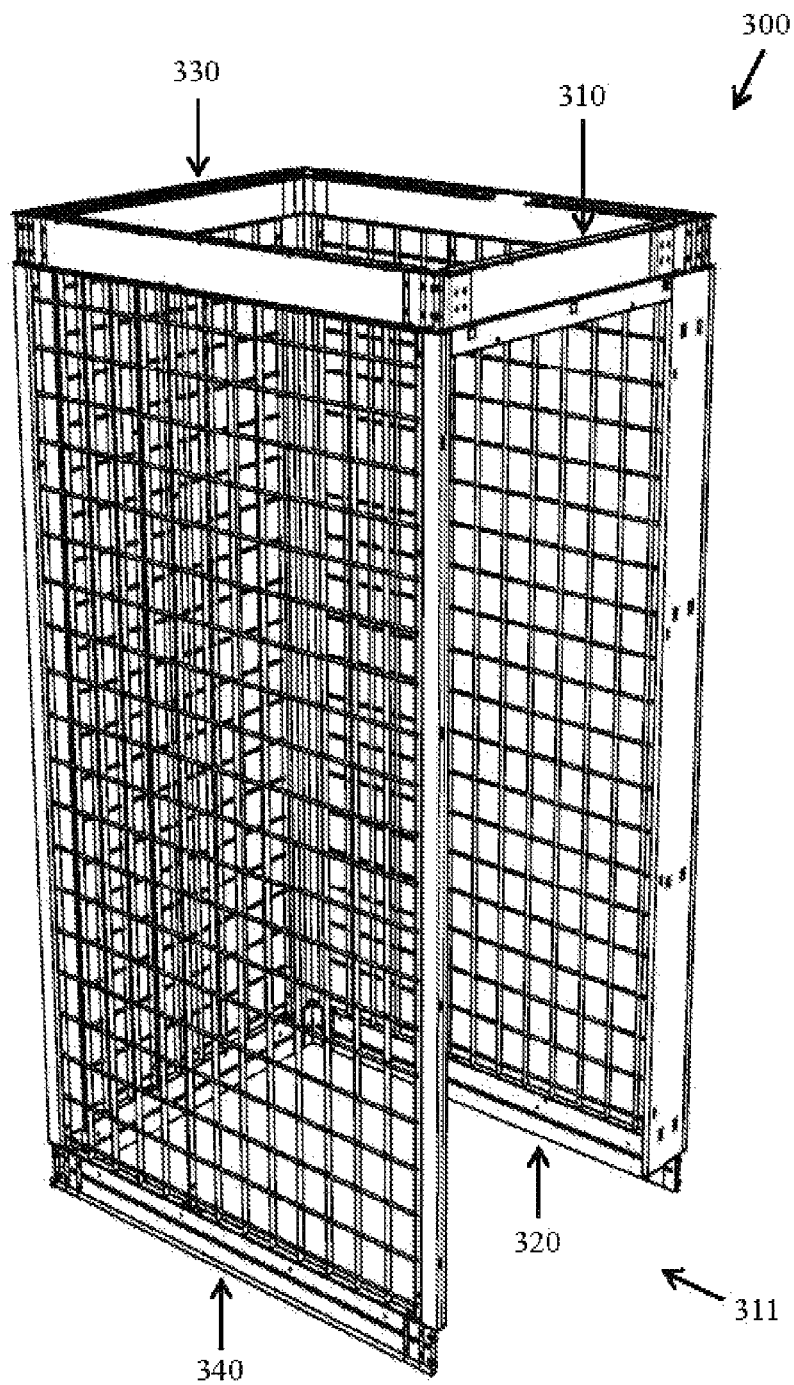
FIG. 4 shows the cage of the car of FIG. 3.
Figure 5:
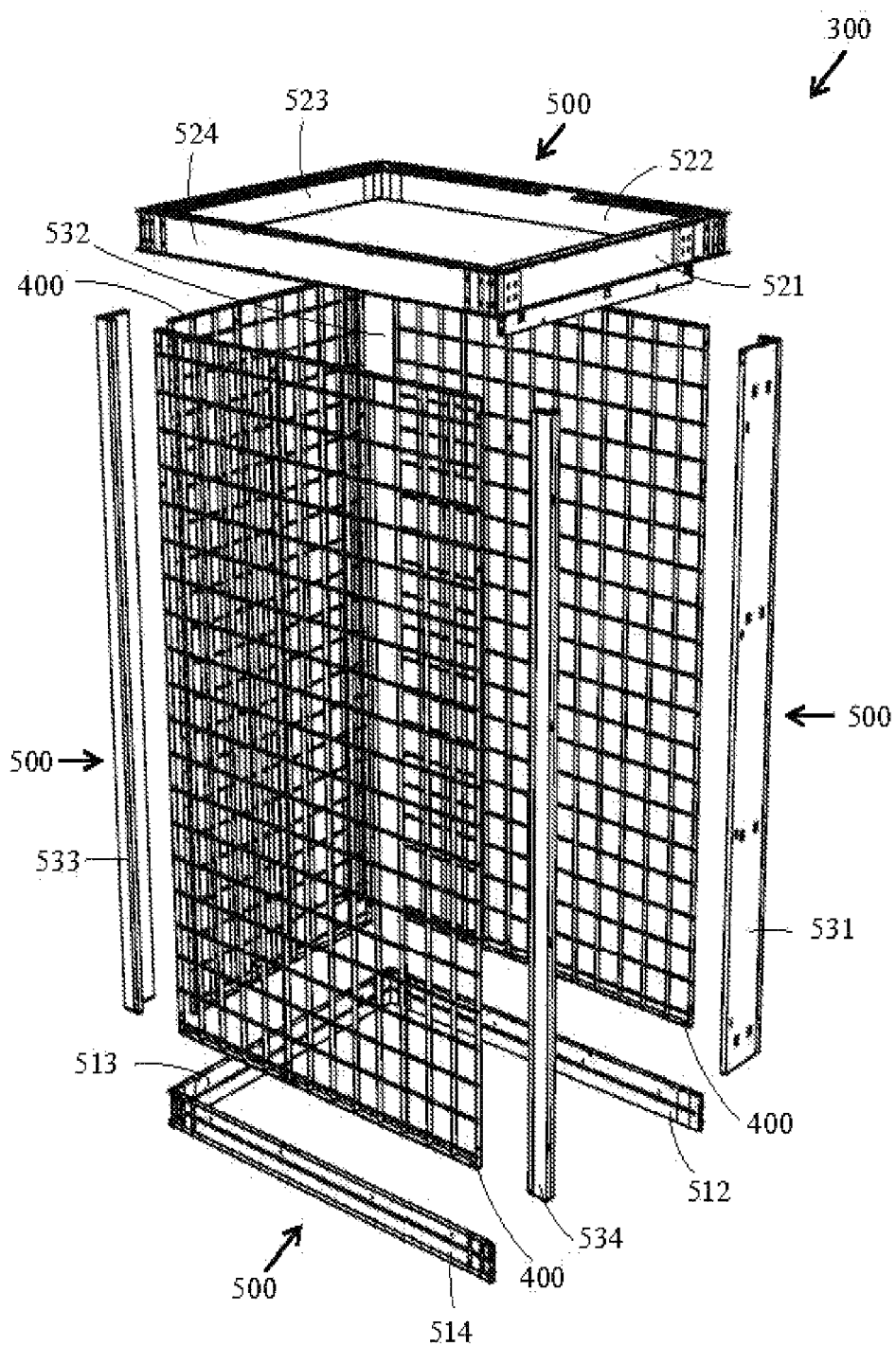
FIG. 5 shows an exploded view of the cage of the car of FIG. 4.
Figure 6:
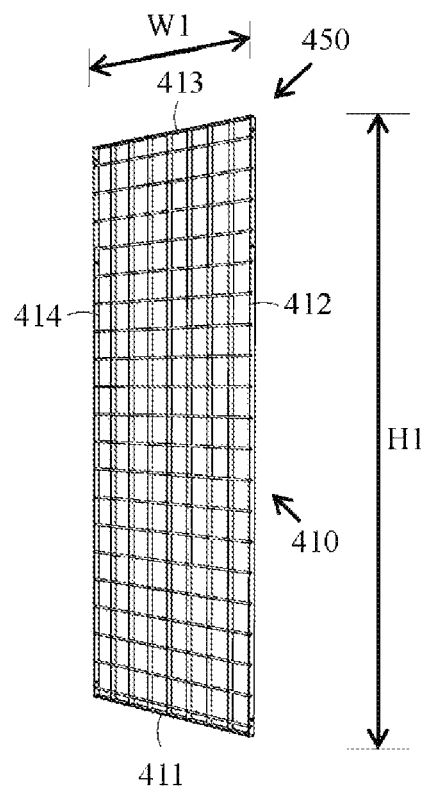
FIG. 6 shows a grid module.
Figure 7:
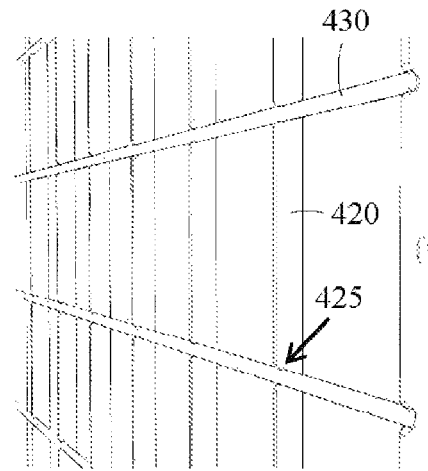
FIG. 7 shows an enlargement of a portion of FIG. 6.

FIG. 3 shows an axonometric view of a car, FIG. 4 shows the cage of the car of FIG. 3, FIG. 5 shows an exploded view of the cage of the car of FIG. 4, FIG. 6 shows a grid module, and FIG. 7 shows an enlargement of a portion of FIG. 6.

The elevator car 10 comprises a bottom 100, an opposite roof 200 and a cage 300 extending between the bottom 100 and the roof 200. The cage 300 comprises walls 310, 320, 330, 340. The bottom 100 and the roof 200 may be horizontal. The walls 310, 320, 330, 340 may be vertical. The walls 310, 320, 330, 340 may be formed of a front wall 310, an opposite back wall 330 and two opposite side walls 320, 340. The front wall 310 may comprise an opening 311 receiving a car door element 315. A horizontal cross section of the cage 300 may be rectangular.

The support structure in at least one wall 310, 320, 330, 340 of the cage 300 may be formed of a grid structure 400 comprising at least one grid module 450. FIGS. 3-5 show a situation in which the support structure in the side walls 320, 340 and the back wall 330 of the cage 300 is formed of a grid structure 400 comprising at least one grid module 450.

FIG. 6 shows a grid module 450 of the grid structure 400. The grid module 450 comprises vertical support rods 420 and horizontal support rods 430 forming a grid and a frame 410 enclosing the vertical support rods 420 and the horizontal support rods 430. The ends of the vertical support rods 420 and the ends of the horizontal support rods 430 are attached to a respective frame element 411, 412, 413, 414 forming a side in the frame 410. The frame 410 may be rectangular.

The frame 410 may comprise a bottom frame element 411, a roof frame element 413, and side frame elements 412, 414. The bottom frame element 411 and the roof frame element 413 may be horizontal. The side frame elements 412, 414 may be vertical. The frame 410 may form a closed outer perimeter of the grid module 450. The vertical support rods 420 extend between the bottom frame element 411 and the top frame element 413 in the frame 410. A first end of the vertical support rods 420 is attached to the bottom frame element 411 and a second opposite end of the vertical support rods 420 is attached to the roof frame element 413. The horizontal support rods 430 extend between the side frame elements 412, 414 in the frame 410. A first end of the horizontal support rods 430 is attached to a first side frame element 412 and a second opposite end of the horizontal support rods 430 is attached to a second opposite side frame element 414.

The horizontal support rods 430 may be positioned in recesses 425 formed in the outer edge of the vertical support rods 420. The horizontal support rods 430 may be attached e.g. through welding to the vertical support rods 420 in the recesses 425 of the vertical support rods 430. The horizontal support rods 420 may advantageously be attached to the vertical support rods 430 in each intersection formed between the horizontal support rods 420 and the vertical support rods 430. The outer surface of the horizontal support rods 420 may be flush with the outer surface of the vertical support rods 420.

The frame elements 411, 412, 413, 414 in the frame of the grid module 450 may be formed of longitudinal flat bars. The vertical support rods 420 in the grid structure 400 may also be formed of longitudinal flat bars. The horizontal support rods 430 in the grid module 450 may be formed of longitudinal round bars. Quick clamping means having a hook-like attachment can be used to easily attach accessories and/or equipment to the horizontal support rods 430 being formed of round bars with a circular cross section.

The grid structure 400 may be formed of two or more adjacent grid modules 450.

The cage 300 may further comprise an adapter frame structure 500 forming a further support structure of the cage 300.

FIG. 5 shows the adapter frame structure 500. The adapter frame structure may comprise a bottom adapter element 512, 513, 514, a roof adapter element 521, 522, 523, 524 and corner adapter elements 531, 532, 533, 534 in each wall 310, 320, 330, 340 comprising the grid structure 400. The bottom adapter elements 512, 513, 514 and the roof adapter elements 521, 522, 523, 524 may be horizontal. The corner adapter elements 531, 532, 533, 534 positioned in the corners of the cage 300 may be vertical.

The adapter frame structure 500 in FIG. 5 comprises three bottom adapter elements 512, 513, 514, four roof adapter elements 521, 522, 523, 524, and four corner adapter elements 531, 532, 533, 534.

The first side wall 320 comprises a first bottom adapter element 512 connecting the bottom frame element 411 of the frame 410 of the grid structure 400 to the bottom 100 of the car 10. The first side wall 320 comprises further a first roof adapter element 522 connecting the roof frame element 413 of the frame 410 of the grid structure 400 to the roof 200 of the car 10.

The second side wall 340 comprises a second bottom adapter element 514 connecting the bottom frame element 411 of the frame 410 of the grid structure 400 to the bottom 100 of the car 10. The second side wall comprises further a second roof adapter element 524 connecting the roof frame element 421 of the frame 410 of the grid structure 400 to the roof 200 of the car 10.

The back wall 330 comprises a third bottom adapter element 513 connecting the bottom frame element 411 of the frame 410 of the grid structure 400 to the bottom 100 of the car 10. The back wall 330 comprises further a third roof adapter element 523 connecting the roof frame element 413 of the frame 410 of the grid structure 400 to the roof 200 of the car 10.

The front wall 310 may further comprise a fourth roof adapter element 521 connecting the ends of the roof adapter elements 522, 524 in the side walls 320, 340.

The adapter frame structure 500 in FIG. 5 comprises further four corner adapter elements 531, 532, 533, 534 extending between the bottom adapter elements 512, 513, 154 and the roof adapter elements 522, 523, 524 in each corner of the cage 300.

Figure 8:
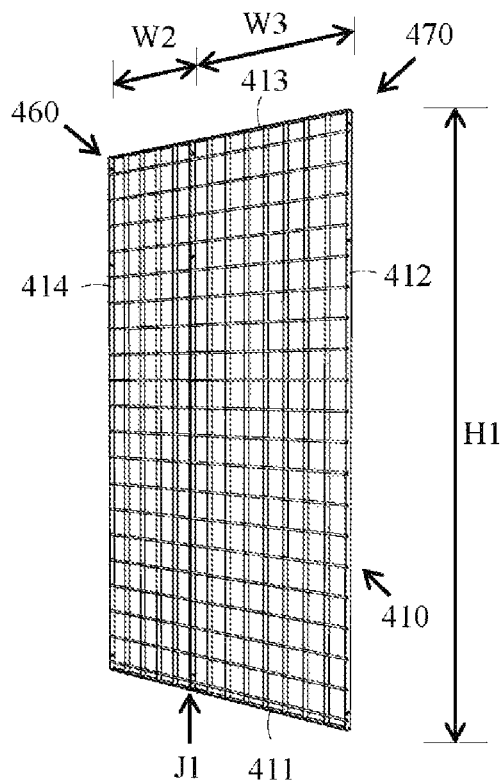
FIG. 8 shows a grid structure formed of two grid modules.
Figure 9:
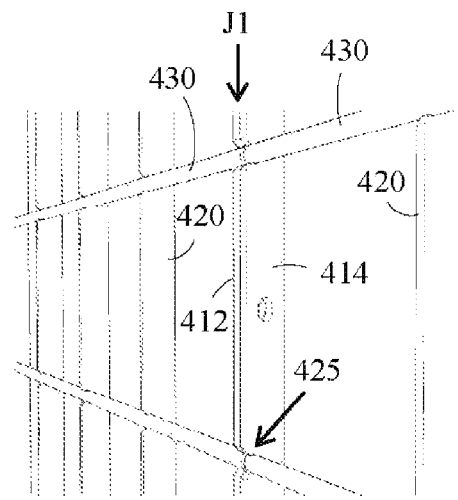
FIG. 9 shows an enlargement of a portion of FIG. 8.

FIG. 8 shows a grid structure formed of two grid modules and FIG. 9 shows an enlargement of a portion of FIG. 8.

The grid structure 400 in the walls 310, 320, 330, 340 of the car 10 may have a modular construction, whereby the grid structure in each wall 310, 320, 330, 340 may be formed of grid modules 460, 470. The side frame elements 412, 414 of two grid modules may be attached to each other in order to form a grid structure 400 in the wall 310, 320, 330, 340 of the cage 300. FIG. 6 shows a grid module 450 having a height H1 and a width W1. There may be a set of grid modules having the same height H1, but a different width W1. The grid structure 400 in each wall 310, 320, 330, 340 of the car 10 may then be composed of a suitable combination of grid modules having a different width W1. FIG. 8 shows two grid modules 460, 470 having a common height H1 and a different widths W2, W3. The two grid modules 460, 470 are attached to each other along the joint J1 from the respective vertical side frame elements 412, 414 in order to form a grid structure 400. The side frame elements 412, 414 of two adjacent grid modules 460, 470 may be attached to each other with bolts and nuts passing through openings in the side frame elements 412, 414. The grid structure 400 formed of the two grid modules 460, 470 comprises still a frame 410 formed by the frame elements 411, 412, 413, 414 in each grid module 460, 470. The vertical support rod 420 in the joint J1 between the modules 460, 470 is formed of two vertical support rods 420 attached to each other.

FIG. 10 shows an axonometric view of a fastening arrangement between two grid modules and FIG. 11 shows the grid fastening element used in FIG. 10.

FIG. 10 shows the grid fastening element 610 in a position connecting the two adjacent grid modules and in a free position. The grid fastening element 610 forms a grid quick clamping means for attaching the side frame elements 412, 414 of two adjacent grid modules. The grid fastening element 610 has a generally longitudinal form. A horizontal cross section of the grid fastening element 610 has a generally rectangular form comprising two opposite short sides 611, 612 and two opposite longs sides 613, 614. A first long side 614 comprises only small end portions 614A, 614B at each corner of the rectangle. The portion of the first long side 614 between the small end portions 614A, 614B comprises an opening O1 extending over the length L1 of the grid fastening element 610. The edges of the small end portions 614A, 614B facing towards the opening O1 comprises outwardly from the first side 614 of the rectangle extending flanges 615, 616. The other flange 615 is short and the other flange 616 is longer. The bottom of the longer flange 616 comprises an inwardly towards the opening O1 curved bottom portion 617.

The grid fastening element 610 may be installed on the side frames 412, 414 simply by hand. The side with the shorter flange 615 is first put around the side frames 412, 414 and the fastening element is then pushed and twisted with one hand so that the side with the longer flange 616 snaps around the side frames 412, 414. The grid fastening element 610 may be uninstalled from the side frames 412, 414 with one hand by pushing and twisting in the opposite direction. The grid fastening element 610 may be dimensioned so that it forms a tight lock between the side frames 412, 414 of two adjacent grid modules.

The grid modules may be attached to each other only with the grid fastening elements 610 or only with bolts and nuts passing through the side frames 412, 414 or with both. Only a few bolts and nuts may be used in the latter case. The grid fastening elements 610 may be positioned at predetermined intervals along the height H1 of the grid module.

The grid fastening elements 610 or corresponding grid fastening elements may also be used to fasten the grid elements 450, 460, 470 to the bottom adapter elements 512-514, to the roof adapter elements 521-524, and to the corner adapter elements 531-534. Bolts and nuts may be used in addition at least to some extent to secure grid elements 450, 460, 470 to the bottom adapter elements 512-514, to the top adapter elements 521-524, and to the corner adapter elements 531-534.

FIG. 12 shows an axonometric view of the fastening of the panels to the grid structure, FIG. 13 shows the vertical seam profile of FIG. 12, FIG. 14 shows the seam profile fastening element of FIG. 13, FIG. 15 shows a cross section of the seam profile fastening element used in FIG. 13 when the panels are to be installed, and FIG. 16 shows a cross section of the seam profile fastening element used in FIG. 13 when the panels have been installed.

FIG. 12 shows that the wall comprises a support construction formed of a grid structure 400 comprising vertical support rods 420 and horizontal support rods 430 and a surface construction formed of panels 700 attached with panel fastening elements 710 to the grid structure 400. The figure shows two adjacent panels 700 positioned on the grid structure 400 in the car 10. The panels 700 are attached with panel fastening elements 710 to the horizontal support rods 430 in the grid structure 400. The panel fastening elements 710 may be attached with screws to the rear surface of the panels 700. A horizontal cross section of the panel fastening elements 710 may have a general form of the letter U. The panel fastening element 710 may be attached from the bottom of the U with e.g. screws passing through openings in the bottom of the U to the back side of the panel 700. The bottom of the U may be flat.

A first branch of the letter U in the panel fastening element 710 positioned further away from the vertical edge of the panel 700 may comprise quick clamping means 711 in the form of a hook-like construction. The quick clamping means 711 will lock the panel 700 in the horizontal direction to the horizontal support rod 430 of the grid structure 400. The panel 700 is first pushed in the horizontal direction towards the grid structure 400 so that the quick clamping means 711 of the panel fastening elements 710 are just above the horizontal support rod 430 after which the panel 700 is pushed slightly downwards in the vertical direction. The hook in the quick clamping means 711 of the panel fastening element 710 will glide on the horizontal support rod 430, whereby the panel 700 becomes detachably locked to the horizontal support rod 430. The panel 700 may be detached from the grid structure 400 by lifting the panel 700 slightly upwards in the vertical direction so that the attachment between the quick clamping means 711 in the panel fastening element 710 and the horizontal support rod 430 in the grid structure 400 is released. The panel 700 may then be lifted out in the horizontal direction from the wall 320, 330, 340.

A second branch of the letter U in the panel fastening element 710 positioned closer to the vertical edge of the panel 700 will be seated in a vertically extending seam profile 620 positioned between two adjacent rows of panels 700. The second branch of the letter U forms a portion of the panel fastening element 710 that is perpendicular to the panel 700.

The vertical seam profile 620 is attached with a seam profile fastening element 630 to the grid structure 400.

The panel fastening elements 710 may be positioned at predetermined intervals in a row on the back side of the panels 700 along the height of the panels 710. A first row of panel fastening elements 710 may be positioned near a first vertical edge of the panel 700 and a second row of panel fastening elements 710 may be positioned near an opposite second vertical edge of the panel 700. There could also be one or more rows of panel fastening elements 710 between the first and the second row of fastening elements 710 depending on the width of the panel 700. The panel 700 may be provided with at least one panel fastening element 710 on each vertical side of the panel 700.

FIG. 13 shows the vertically extending seam profile 620 comprising a bottom portion 621 and a middle portion 622.

A horizontal cross section of the bottom portion 621 has the general shape of a letter U. The branches of the letter U may comprise, starting from the bottom of the letter U, a slightly inwards bent inner portion followed by a slightly outwards bent outer portion. A horizontal cross section of the middle portion 622 has a general shape of a letter I. The middle portion 622 may be provided with two cross arms. The middle portion 622 may extend between the branches of the U e.g. in the middle of the U. The middle portion 622 may extend between the branches in the U in the bottom portion 621. The middle portion 622 may start from a bottom of the U in the bottom portion 621 and extend outwards beyond the outer edges of the branches of the U in the bottom portion 621. The middle portion 622 may comprise a first support block 623 forming a first cross beam extending in the transverse direction in relation to the middle portion 622 and a second support block 624 forming a second cross beam also extending in the transverse direction in relation to the middle portion 622. The second cross beam 624 may be longer than the first cross beam 623. The first support block 623 may be positioned between the vertical edges of the panels 700 as can be seen from FIG. 12. The second support block 624 may form a seat for the panels 700 as can be seen from FIG. 12. The rear surface of the panels 700 at the vertical edge of the panels 700 will be seated against the second support block 624. The opposite vertical edges of the two rows of panels 700 will be seated against the side surfaces of the first support block 623.

FIG. 14 shows a seam profile fastening element 630 with which the seam profile 620 may be attached to the horizontal support rods 430 in the grid structure 400. A horizontal cross section of the seam profile fastening element 630 has the general form of a letter U. The bottom of the U comprises hook-like portions 631, 632 at both ends of the seam profile fastening means 630 forming quick clamping means for locking the seam profile fastening element 630 to the horizontal support rods 430. The length of the seam profile fastening element 630 may be such that the seam profile fastening element 630 extends over two adjacent horizontal support rods 430. The seam profile fastening element 630 may be attached to both of the two adjacent horizontal support rods 430. The seam profile fastening element 630 could extend over several horizontal support rods 430 and be attached only at the ends or also between the ends to the horizontal support rods 430. The branches of the letter U may comprise, starting from the bottom of the letter U, a slightly inwards bent inner portion followed by a slightly outwards bent outer portion. The seam profile fastening element 630 may be dimensioned so that it forms a tight shape locking around the bottom part 621 of the seam profile 620. The bottom of the seam profile fastening element 630 i.e. the bottom of the U may be flat.

The seam profile 620 may extend in the vertical direction over the height of the grid structure 400. The seam profile 620 forms a uniform spacing between two adjacent vertical rows of panels 700. The uniform spacing is determined by the first support block 623. The second branch of the fastening element 710 of the panel 700 which is positioned inside the U-shaped bottom portion 621 of the seam profile 620 will press the vertical edge of the panel 700 against the first support block 623.

The seam profile fastening elements 630 are first attached to the horizontal support rods 430 at predetermined intervals along the height of the seam profile 620. The seam profile 620 is then simply pushed into the seam profile fastening elements 630. The bottom of the seam profile 620 will be seated against the horizontal support rods 430 in the grid structure 400. The side surfaces of the seam profile fastening elements 630 grip on the corresponding side surfaces of the bottom part 621 of the seam profile 620 forming a shape locking between the seam profile 620 and the seam profile fastening element 630.

FIG. 15 shows a cross section of the seam profile fastening element used in FIG. 13 when the panels are to be installed, and FIG. 16 shows a cross section of the seam profile fastening element used in FIG. 13 when the panels have been installed.

The bottom portion 621 of the seam profile 620 has been pushed into the seam profile fastening element 630. There is thus a form locking between the bottom portion 621 of the seam profile 620 and the seam profile fastening element 630. The bottom of the bottom portion 621 of the seam profile 620 seats against the horizontal support rod 430 when the bottom portion 621 of the seam profile 620 is in the locked position within the seam profile fastening element 630. The seam profile fastening element 630 is attached to the horizontal support rod 430 as shown in FIG. 14.

The first branches 712 of the U-formed panel fastening elements 710 that are further away from the vertical edges of the panels 700 may be provided with the quick clamping means 711 for attaching to the horizontal support rods 430 when the panels 700 are installed on the grid structure 400. The second branches 713 of the U-formed panel fastening elements 710 that are closer to the vertical edges of the panels 700 may be pushed into the lower portion 621 of the seam profile element 620 when the panels 700 are installed on the grid structure 400. The second branches 713 of the U form a portion of the panel fastening element 710 that may be perpendicular to the panel 700. The second branch 713 of the U may extend into contact with an inside surface of a respective branch of the U-shaped bottom portion 621 of the seam profile 620 in order to secure the vertical side edge of the panel 700 to the middle portion 622 of the seam profile 620.

The middle portion 622 of the seam profile 620 may be positioned between the vertical edges of the panels 700 when the panels 700 are installed. The first support block 623 of the middle portion 622 of the seam profile 620 is positioned in the seam between the panels 700. The vertical edges of the panels 700 are pressed against the vertical edges of the first support block 623. The rear surface of the panels 700 near the vertical edges of the panels 700 is positioned against the second support block 624 as shown in FIG. 16. The first support block 623 determines the horizontal distance between the vertical edges of the panels 700. The second support block 624 determines the position of the edges of the panels 700 in the depth direction i.e. in a direction perpendicular to the wall. FIG. 16 shows that the rear surface of the panel 700 is at a small distance from the outer edge of the vertical support rods 420 in the grid structure 400 when the panels 700 are installed. The first support block 623 extends in a transverse direction in relation to the middle portion 622 of the seam profile 620. The second support block 624 extends also in a transverse direction in relation to the middle portion 622 of the seam profile 620. The first support block 623 is positioned at a small horizontal distance from the plane formed by the front surfaces of the panels 700. A small recess is thus formed in the vertical seams between the panels 700.

FIGS. 15 and 16 show that the branches of the letter U in the seam profile fastening element 630 and in the bottom portion 621 of the seam profile 620 comprises, starting from the bottom of the letter U, a slightly inwards bent inner portion followed by a slightly outwards bent outer portion.

The seam profile fastening element 630 may be made of spring steel. A tight form locking between the seam profile fastening element 630 and the bottom portion 621 of the seam profile 620 can thus be maintained during the life time of the construction.

The seam profile 620 may be formed as one entity e.g. by injection moulding.

FIG. 17 shows an axonometric view of a fastening arrangement for a handrail or a seat in the elevator car, FIG. 18 shows an enlargement of the accessory fastening element of FIG. 17 on the grid structure and FIG. 19 shows the accessory fastening element used in FIGS. 17 and 18.

FIG. 17 sows a handrail 810 provided with a suitable fastening construction 820. The handrail 810 may be attached to a wall 310, 320, 330, 340 in the car 10 with a fastening means e.g. a bolt 830 passing through the fastening construction 820. A bushing 825 in the fastening construction 820 passes through an opening in the panel 700 when the handrail 810 is attached to a wall 320, 340 in the car 10. The figure shows a handrail 810, but also a pivoted seat 850 could be attached in the same way to a wall 310, 320, 330, 340 in the car 10 with a corresponding bolt passing through a corresponding fastening construction in the pivoted seat 850.

An accessory fastening element 640 may be used to fasten the handrail 810 and/or the pivoted seat 850 onto a wall 310, 320, 330, 340 in the car 10. The accessory fastening element 640 may comprise a frame 641 having the general form of a longitudinal flat bar with a generally rectangular cross section. The frame 641 of the accessory fastening element 640 has a length L10 and a width W10. The frame 641 may extend over two adjacent horizontal support rods 430 in the grid structure 400. The frame 641 may extend generally in the vertical direction over the horizontal support rods 430. The frame 641 of the accessory fastening element 640 may comprise two recesses 642, 643. Each recess 642, 643 may be positioned at a respective end portion of the frame 641. Each recess 642, 643 may have a hook-like form. The accessory fastening element 640 may be hanged on two adjacent horizontal support rods 430 from the recesses 642, 643. Each of the recesses 642, 643 receives a respective horizontal support rod 430.

The accessory fastening element 640 may further comprise a locking device 645. The locking device 645 may be connected to the frame 641 of the accessory fastening element 640. The locking device 645 may be formed as a latch. A cross section of the locking device 645 may have the form of a letter U. The branches of the U may be positioned on opposite sides of the frame 641 of the accessory fastening element 640. An upper end of the locking device 645 may be attached with an articulated joint J10 to an upper end of the frame 641 of the accessory fastening element 640. The articulated joint J10 may be formed of a shaft extending between the branches of the U and passing through an opening in the frame 641 of the accessory fastening element 640. The locking device 645 can thus be turned around the articulated joint J10 between a locked position and an unlocked position. The longitudinal direction of the locking device 645 is parallel with the longitudinal direction of the frame 641 of the accessory fastening element 640 in the locked position (FIG. 15). The longitudinal direction of the locking device 645 forms an angle α with the longitudinal direction of the frame 641 of the accessory fastening element 640 in the unlocked position (FIGS. 16 and 17). A lower edge of the locking device 645 may comprise a recess 646. The recess 646 is positioned in each branch of the U. The recess 646 in the locking device 645 may be adapted to receive the horizontal support rod 430 when the locking device 645 is in the locked position i.e. when the locking device 645 is parallel with the frame 641 of the accessory fastening element 640. The accessory fastening element 640 cannot be moved upwards i.e. the accessory fastening element 640 cannot be detached from the horizontal support rods 430 when the locking device 645 is in the locked position.

The frame 641 of the accessory fastening element 640 comprises further an attachment member 647 e.g. a cylindrical part with an internal threading for receiving a fastening means 830 e.g. a fastening bolt in order to attach the handrail 810 or the pivoted seat 850 to the grid structure 400 in the wall 320, 340 of the car 10. The attachment member 647 may extend in the direction of the width W10 of the frame 641 of the accessory fastening element 640 i.e. in a direction perpendicular to the plane of the wall. The bushing 825 may pass through an opening formed in the panel 700 into contact with an outer end surface of the attachment member 647. The length of the bushing may correspond to the thickness of the panel 700. The outer end surface of the attachment member 647 may be flush with or at a small distance from the inner surface of the panels 700.

The frame 641 of the accessory fastening element 640 may extend in the vertical direction over two adjacent horizontal support rods 430 in the figure. This will be a suitable solution for attaching a handrail 810 to the grid structure 400. The frame 641 of the accessory fastening element 640 may on the other hand extend in the vertical direction over several horizontal support rods 430. The frame 641 of the accessory fastening element 640 could in fact extend over the whole height of the car 10 if necessary. The frame 641 of the accessory fastening element 410 may comprise a suitable number of hook like recesses 642, 643 for attaching the accessory fastening element 640 to as many horizontal support rods 430 as needed. Also a pivoted seat 850 in the car 10 may thus be attached with the accessory fastening element 640 to the grid structure 400. The frame 641 of the accessory fastening element 640 may also instead of comprising only one attachment member 647 comprise two or more attachment members 647.

The width W10 of the frame 641 of the accessory fastening element 640 may be such that the edge of the frame 641 does not protrude inwards from the inner edge of the vertical support rod 420 in the grid structure 400 when the accessory fastening element 640 is locked to the grid structure 400.

The panel 700 installed on the inner surface of the grid structure 400 will prevent the latch 645 from opening by mistake.

FIG. 20 shows a cross section of a horizontal seam profile. The horizontal seam profile 650 extends in the horizontal direction between two adjacent panels 700. The length of the horizontal seam profile 650 is the same as the horizontal width of the panels 700. The horizontal seam profile 650 comprises a bottom portion 651 extending at the back of the panels 700, a middle portion 652 extending between two adjacent panels 700, and an end portion 653 forming the visible portion of the horizontal seam profile 650 between the panels 700. The end portion 653 is slightly smaller than the middle portion 652 so that the edges of the panels 700 rest only on the middle portion 652. The end portion 653 will thus not contact the edges of glass elements that might be attached to the inner surface of the panels 700. The horizontal seam profile 650 need not be attached to the grid structure 400. The bottom portion 651 of the horizontal seam profile 650 extending at the back of the panels 700 will keep the horizontal seam profile 650 in place. The bottom portion 651 of the horizontal seam profile 650 may be dimensioned to be pressed between the inner edge of the vertical support rods 420 in the grid structure and the rear surface of the panels 700. The rear surface of the panels 700 is at a small distance from the inner edge of the vertical support rods 420 in the grid structure 400.

FIG. 21 shows a cross section of a bottom levelling arrangement. A levelling profile 660 is positioned at the lower end of the wall 320, 340 near the bottom 100 of the car 10. The bottom adapter element 512 may be provided with openings O10, whereby air F1 may be directed into the car 10 through said openings O10. The levelling profile 660 comprises a horizontal bottom portion 661 forming a horizontal support surface for the lower horizontal edge of the lowermost panel 700. The levelling profile 660 comprises further vertical top portion 662 through which the levelling profile 660 may be attached to the bottom adapter element 512 of the cage 300. The bottom adapter element 512 may be provided with a bracket having a vertically extending oblong opening. The levelling profile 660 may be attached with self-clinching bolts and nuts to the bracket. The vertically extending oblong opening in the bracket allows for vertical adjustment of the levelling profile 660. The levelling profile 660 may thus be adjusted according to the thickness of the floor 100 of the car 10. The levelling profile 660 may further comprise a portion comprising a step 663. The openings O10 in the bottom adapter element 512 will be hidden behind the levelling profile 660. The levelling profile 660 may form a horizontal levelling surface for the horizontal lowermost row of panels 700. The stepped portion 663 of the levelling profile 660 forms a passage for the air F1 into the car 10. The levelling profile 660 may be attached to the bottom adapter profile 512 so that the bottom portion 661 of the levelling profile is horizontal.

FIG. 22 shows a cross section of a locking arrangement of the panels. The vertical rows of panels 700 may be locked with a locking profile 670 positioned in the space between the upper edge of the uppermost row of panels 700 and the roof 200. The locking profile 670 may be formed of an angle iron extending over the width of the uppermost row of panels 700. The locking profile 670 may be positioned on the upper edge of the uppermost row of panels 700 and attached with screws to the roof adapter element 522. The locking profile 670 will lock the panels 700 in the vertical direction, whereby removal of panels 700 from the wall 310, 320, 330, 340 is not possible until the locking profile 670 has been removed.

The panels 700 can be customized according to the different needs in the car 10. Different functionalities could be integrated into the panels 700. There could be panels 700 having light modules e.g. LED modules integrated into the panel 700. These panels 700 with light modules could be used in the roof 300 of the car 10. A user interface including an information screen and operating means for the elevator car 10 can be integrated into a panel 700. Ventilation modules or air conditioning modules could also be integrated into the panels 700 in order to provide ventilation in the elevator car 10. There could be passages e.g. holes passing in the panels 700 for cables and piping. The materials of the surfaces facing towards the interior of the elevator car 10 in the panels 700 could be varied in order to achieve a desired design of the interior of the elevator car 10.

The panels 700 can be made of a light material as they will not form part of the support structures of the car 10. They could be made of a honeycomb fabricated from thermoplastic, e.g. a polypropylene honeycomb. All the functionalities needed in the elevator car 10 could easily be integrated into such a material.

The car 10 may in addition to the panels 700 forming the inner surface of the walls 320, 330, 340 of the car 10 comprise panels forming an outer surface of the walls 320, 330, 340 of the car 10. The panels on the outer surface of the walls 320, 330, 340 of the car 10 may by formed of thin sheets as they are only used to improve the appearance of the car 10 in an open shaft 20 where the elevator car 10 is visible from the outside of the shaft 20. Both the interior panels 700 and the exterior panels may be attached to the horizontal support rods 430 in the grid structure 400.

The figures show an embodiment in which the car 10 has only one car door element 315 positioned in the front wall 310 of the cage 300. The invention can, however, be used also in a car 10 having a door element in the front wall 310 and in the back wall 330 or even in a car 10 having a door element 315 in three of the walls 310, 320, 330, 340 of the car 10. The grid structure 400 and the adapter structure 500 may be used in the wall or walls 310, 320, 330, 340 of the cage 300 that do not have a door element 315. The grid structure 400 and the adapter structure 500 may, however, also be used in a wall provided with a car door element 315. There could be a small wall portion on either or on both sides of the door element 315 in the cage 300, whereby said wall portions could be provided with the grid structure 400 and/or the adapter structure 500.

The figures show an embodiment in which the grid structure 400 and the adapter structure 500 are used together in the walls 310, 320, 330, 340 of the car 10. It would be possible to use only the grid structure 400 as a support structure in the walls 310, 320, 330, 340 of the car 10.

The adapter structure 500 may provide additional flexibility, additional strength, and additional precision to the support structure in the walls 310, 320, 330, 340 of the car 10. The bottom adapter elements 512-514 may be dimensioned and adapted to different bottom platforms 100 so that the walls 320, 330, 340 can easily be attached to the bottom 100. The grid structure 400 may remain unchanged in different bottom platforms 100 as only the bottom adapter elements 512-514 are changed. The height of the car 10 may further be fine-tuned with the adapter structure 500. The adapter structure 500 may also contribute to the noise and dust isolation of the car 10. It may also be easier to achieve a controlled ventilation of the car 10 with the adapter structure 500. The roof adapter elements 521-524 may on the other hand be dimensioned and adapted according to the construction of the roof 200 so that the walls 320, 330, 340 can easily be attached to the roof 200.

Only a limited number of modules in the grid structure 400 are needed in order to be able to adapt the width of the walls 310, 320, 330, 340 to normal building standards e.g. to dimensions spaced by 100 mm. The fine tuning of the dimensioning may be done with the adapter structure 500.

The car 10 may be provided with a car frame 11 i.e. a sling or the sling 11 may be integrated into the car 10. The sling 11 may be integrated into the car 10 so that the uprights passing vertically on both sides of the car 10 are left out. The support structure in the walls 310, 320, 330, 340 of the car 10 may form a sufficiently rigid support for the car 10. The shaft efficiency may be increased if the uprights in the sling 11 may be left out.

The seam profile 620 in the figures is provided with a middle portion 622 having two support blocks 623, 624. This is an advantageous embodiment as the panels 700 are effectively adjusted into a correct position with this arrangement. The support blocks 623, 624 might be left out in which case the middle portion 622 would determine the distance in the horizontal direction between the vertical edges of the panels 700. The position of the panels 700 in the depth direction could be determined by the outer ends of the branches of the bottom portion 621 of the seam profile 620. The outer ends of the branches of the bottom portion 621 of the seam profile 620 would seat against the bottom of the panel fastening elements 710.

The material of the grid structure 400 and of the adapter structure 500 may be iron. The material of the vertical seam profile 620 and of the horizontal seam profile 650 may be iron or aluminium. The material of the grid fastening elements 610 may be plastic or spring steel. The material of the seam profile fastening elements 630 may be spring steel. The material of the panel fastening elements 710 may be iron. The material of the equipment fastening elements 640 may be iron. The material of the locking device 645 in the equipment fastening elements 640 may be spring steel.

The grid modules could be manufactured e.g. in four heights 2100 mm, 2200 mm, 2300 mm and 2400 mm. The width of the car 10 in the second direction S2 may be in the range of 700 mm to 1600 mm. The depth of the car 10 in the third direction S3 may be in the range of 1000 mm to 2500 mm. There could be a set of grid modules having a common height but a different width. The required width for each car wall could then be achieved by combining two or more grid modules with different widths.

The mesh size in the grid structure 400 may advantageously be 100 mm times 100 mm in all modules. The frame elements 411, 412, 413, 414 in the grid structure 400 may in all modules have a thickness of 4 to 5 mm and a depth of 20 mm. The vertical support rods 420 in the grid structure may in all modules have a thickness of 3 mm and a depth of 20 mm. The diameter of the horizontal support rods 430 in the grid structure 400 may in all modules be 6 mm.

There will thus be a free space between adjacent vertical support rods 420 in the grid structure 400. The depth of the free space may be 14 mm measured from the inner surface of the vertical support bars 420 to the inner surface of the horizontal support bars 430. This free space may be used for cabling etc. passing in the vertical direction in the wall 320, 330, 340 of the car 10.

The thickness of the panels 700 may be 12 mm. There may be a space, e.g. 2 mm between the rear surface of the panels 700 and the inner edge of the grid structure 400.

The bottom 100 of the car 10 may be formed as a bottom platform having a generally rectangular form adapted to the horizontal cross section of the cage 300. The bottom platform 100 may be modular so that it is easy to adapt to cars of different size. The bottom platform 100 may have a sandwich structure comprising two surface plates and a core between the surface sheets. The core may be of a material having a honeycomb structure or a flute profile bent from metal or a honeycomb fabricated from thermoplastic, e.g. a polypropylene honeycomb. The surface plates may be of a sandwich board of metal material e.g. aluminium. The surface plates may be attached to the core by welding, gluing or riveting.

The roof 200 of the car 10 may be formed as a metal structure adapted to the cross section of the cage 300. A prior art roof construction may be used in the car 10. The roof may be installed on top of the roof adapter elements 521-524.

It will be obvious to a person skilled in the art that, as the technology advances, the inventive concept can be implemented in various ways. The invention and its embodiments are not limited to the examples described above but may vary within the scope of the claims.

The invention claimed is:

1. An elevator car wall, wherein the car wall comprises a support construction formed of a grid structure with vertical support rods and horizontal support rods and a surface construction formed of panels attached with panel fastening elements to the grid structure, adjacent vertical rows of panels being separated by a vertical seam profile that is attached with seam profile fastening elements to the grid structure, the seam profile comprising:
- a bottom portion having a U-shaped horizontal cross section; and
- a middle portion having an I-shaped horizontal cross section, the middle portion extending between branches of the U in the bottom portion from a bottom of the U outwards beyond outer ends of the branches of the U and further in between vertical edges of the adjacent rows of panels,
- wherein a portion of the panel fastening element extends into contact with an inside surface of a respective branch of the U-shaped bottom portion of the seam profile in order to secure the vertical edges of the panel to the middle portion of the seam profile.

2. The elevator car wall according to claim 1, wherein the middle portion of the seam profile comprises a first support block at an outer end of the middle portion, whereby vertical edges of the adjacent vertical rows of the panels seat against side edges of the first support block.

3. The elevator car wall according to claim 2, wherein the middle portion of the seam profile comprises a second support block inwards from the first support block, whereby a rear surface of the panels near the vertical edge of the panel is seated against the second support block.

4. The elevator car wall according to claim 2, wherein the seam profile fastening element extends in a vertical direction over at least two adjacent horizontal support rods in the grid structure, the seam profile fastening element has a U-shaped horizontal cross section, the bottom of the U comprising a hook-like portion at each end portion of the seam profile fastening element forming a quick clamp for locking the seam profile fastening element to a respective horizontal support rod, the bottom portion of the seam profile being received within the U of the seam profile fastening element.

5. The elevator car wall according to claim 2, wherein each branch in the U-shaped bottom portion of the seam profile comprises, starting from the bottom of the U, an inwardly inclined portion followed by an outwardly inclined portion.

6. The elevator car wall according to claim 2, wherein the panel fastening elements have a U-shaped horizontal cross section, whereby a branch of the U that is closer to the vertical edge of the panel forms the portion of the fastening element that extends into contact with the inside surface of the respective branch of the U-shaped bottom portion of the seam profile.

7. The elevator car wall according to claim 1, wherein the middle portion of the seam profile comprises a second support block inwards from a first support block, whereby a rear surface of the panels near the vertical edge of the panel is seated against the second support block.

8. The elevator car wall according to claim 7, wherein the seam profile fastening element extends in a vertical direction over at least two adjacent horizontal support rods in the grid structure, the seam profile fastening element has a U-shaped horizontal cross section, the bottom of the U comprising a hook-like portion at each end portion of the seam profile fastening element forming a quick clamp for locking the seam profile fastening element to a respective horizontal support rod, the bottom portion of the seam profile being received within the U of the seam profile fastening element.

9. The elevator car wall according to claim 7, wherein each branch in the U-shaped bottom portion of the seam profile comprises, starting from the bottom of the U, an inwardly inclined portion followed by an outwardly inclined portion.

10. The elevator car wall according to claim 7, wherein the panel fastening elements have a U-shaped horizontal cross section, whereby a branch of the U that is closer to the vertical edge of the panel forms the portion of the fastening element that extends into contact with the side surface of the respective branch of the U-shaped bottom portion of the seam profile.

11. The elevator car wall according to claim 1, wherein the seam profile fastening element extends in a vertical direction over at least two adjacent horizontal support rods in the grid structure, the seam profile fastening element has a U-shaped horizontal cross section, the bottom of the U comprising a hook-like portion at each end portion of the seam profile fastening element forming a quick clamp for locking the seam profile fastening element to a respective horizontal support rod, the bottom portion of the seam profile being received within the U of the seam profile fastening element.

12. The elevator car wall according to claim 11, wherein each branch in the U-shaped bottom portion of the seam profile comprises, starting from the bottom of the U, an inwardly inclined portion followed by an outwardly inclined portion.

13. The elevator car wall according to claim 11, wherein the panel fastening elements have a U-shaped horizontal cross section, whereby a branch of the U that is closer to the vertical edge of the panel forms the portion of the fastening element that extends into contact with the inside surface of the respective branch of the U-shaped bottom portion of the seam profile.

14. The elevator car wall according to claim 1, wherein each branch in the U-shaped bottom portion of the seam profile comprises, starting from the bottom of the U, an inwardly inclined portion followed by an outwardly inclined portion.

15. The elevator car wall according to claim 14, wherein each branch in seam profile fastening element comprises, starting from the bottom of the U, an inwardly inclined portion followed by an outwardly inclined portion, whereby the seam profile can simply be pushed into the seam profile fastening element, the locking between the seam profile and the seam profile fastening element being formed as a shape locking.

16. The elevator car wall according to claim 15, wherein the panel fastening elements have a U-shaped horizontal cross section, whereby a branch of the U that is closer to the vertical edge of the panel forms the portion of the fastening element that extends into contact with the inside surface of the respective branch of the U-shaped bottom portion of the seam profile.

17. The elevator car wall according to claim 14, wherein the panel fastening elements have a U-shaped horizontal cross section, whereby a branch of the U that is closer to the vertical edge of the panel forms the portion of the fastening element that extends into contact with the inside surface of the respective branch of the U-shaped bottom portion of the seam profile.

18. The elevator car wall according to claim 1, wherein the panel fastening elements have a U-shaped horizontal cross section, whereby a branch of the U that is closer to the vertical edge of the panel forms the portion of the fastening element that extends into contact with the inside surface of the respective branch of the U-shaped bottom portion of the seam profile.

19. The elevator car wall according to claim 18, wherein a branch of the U that is further away from the vertical edge of the panel comprises a quick clamp in the form of a hook-like construction for locking the panel in the horizontal direction to the horizontal support rod of the grid structure.

\* \* \* \* \*